United States Patent [19]
Allegro

[11] 4,158,357
[45] Jun. 19, 1979

[54] INNER ROOF SOLAR SYSTEM

[76] Inventor: Joseph Allegro, 377 Ellamar Rd., West Palm Beach, Fla. 33405

[21] Appl. No.: 861,450

[22] Filed: Dec. 16, 1977

Related U.S. Application Data

[63] Continuation-in-part of Ser. No. 809,361, Jun. 24, 1977.

[51] Int. Cl.² ............................................. F24J 3/02
[52] U.S. Cl. ................................................. 126/271
[58] Field of Search ................ 126/270, 271; 237/1 A

[56] References Cited

U.S. PATENT DOCUMENTS

| | | | |
|---|---|---|---|
| 2,552,237 | 5/1951 | Trombe | 126/271 |
| 3,039,453 | 6/1962 | Andrassy | 126/271 |
| 3,815,574 | 6/1974 | Gaydos, Jr. | 126/271 |
| 4,000,850 | 1/1977 | Diggs | 126/271 |
| 4,015,582 | 4/1977 | Liu et al. | 126/271 |

FOREIGN PATENT DOCUMENTS

| | | | |
|---|---|---|---|
| 2309307 | 8/1974 | Fed. Rep. of Germany | 126/271 |
| 323272 | 12/1934 | Italy | 126/271 |

*Primary Examiner*—Kenneth W. Sprague
*Attorney, Agent, or Firm*—Laurence R. Brown

[57] ABSTRACT

The invention adds liquid solar heating to conventional house construction without altering the plans. Sections of moulded polyester resin embedding pipes connect together to provide a continuous liquid pathway which is hidden from view, or conduits may be moulded in the polyester resin thereby eliminating the pipes. The sections are artistically styled, obviating the unsightly appearance of present day solar equipped homes. The arrangement is very inexpensive, yet durable, and not subject to glass panels and its attendant breakage or the use of expensive copper tubing. The entire roof is a collector and different parts of the roof are exposed to the direct sunlight at all times of the day. Longitudinal seams accommodating thermal expansion are provided between adjacent sections by a trough terminating one section and a trough covering extrusion terminating the adjacent section. Rain and snow water run down the trough and off of the roof.

The solar sections actually replace the shingles, tile or other outer coating of the conventional roof for new construction. Hence, the solar section is integral with the house, making it more stormproof, yet workmen may walk over the roof.

2 Claims, 8 Drawing Figures

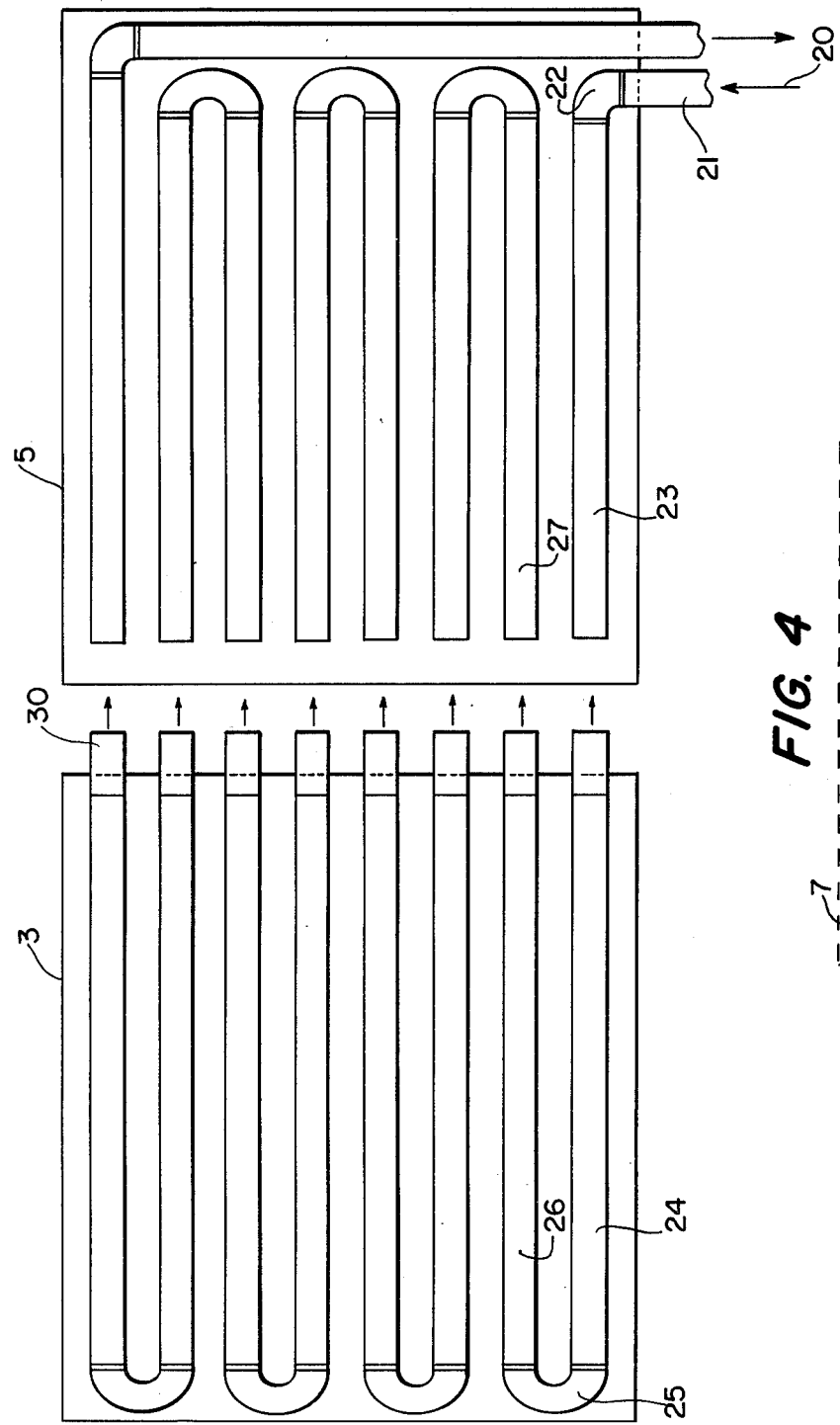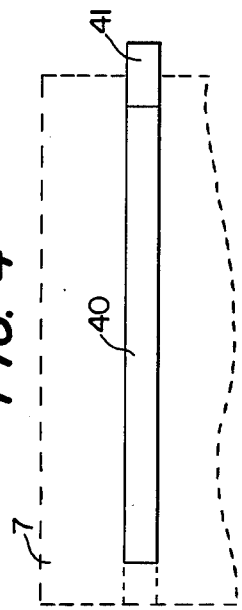

INNER ROOF SOLAR SYSTEM

The present application is a continuation-in-part of my earlier filed application Ser. No. 809,361 filed June 24, 1977, entitled INNER ROOF SOLAR SYSTEM, and presently pending.

PRIOR ART

U. S. Pat. No. 4,006,856 is typical of the panel type solar heated construction and does not teach a hidden liquid system. U.S. Pat. No. 4,020,989 shows structure incorporated into the original building plans which is not simple or inexpensive and also does not teach a hidden liquid system.

THE INVENTION

The present invention discloses solar heating construction, in modular interconnectible form, which may comprise the entire roof of a conventional building. Casting of the sections in polyester resin moulds with embedded pipes insures reliable inexpensive, easily incorporable structures which may serve as the entire exterior roof section.

The liquid passage way is entirely hidden—no glass panels are visible—artistic sculpture may be designed into the mould at present a pleasant view, in contrast to todays unsightly shaped solar structures.

Basically, three moulds may provide for an entire house roof, i.e. outer end sections and an interconnecting middle section, cast to size can cover most roof sections. But, the present sections may be connected in larger numbers to fit the outline of the roof being covered—usually over new tar paper.

Graduated size pipes may be used to fit the contour of the moulded sections for artistic sculpture.

The heated water, via the holding tank heat exchanger, (in the attic or elsewhere) can supply hot water for domestic use even to warm a swimming pool. For modification for air conditioning, several similar panels are used to develop more solar heat. These panels contain aluminum frames, preferably covered by glass to create an air trap over existing solar structure.

The use of beads, such as silica sand, (preferably coarse size) strengthen the polyester resin and permit use of lighter pipes. Similarly, glass bubbles are good heat conductors, which may be used to decrease the quantity of sand and hence, weight of the panels, however, glass bubbles are more expensive than sand.

Modifications of the basic invention are presented which replace the p.v.c. pipes to c.p.v.c. pipes by moulding conduits in the polyester resin. Please not conduits are considered the same as the pipes. Also, silica sand is a good heat conductor and may replace, or be mixed with the bubbles to enhance fire-proofing for building code compliance.

Thermal expansion may be accommodated without sacrificing waterproofing by mating the longitudinal edges of adjacent sections. A moulded through along one edge of a section received a trough covering extension terminating its adjacent section.

The invention will be better understood from a reading of the following detailed description thereof, when taken in light of the accompanying drawings, wherein:

FIG. 3 is a plan view of outer sections;

FIG. 4 is a partial view of intermediate section;

Figure 1:
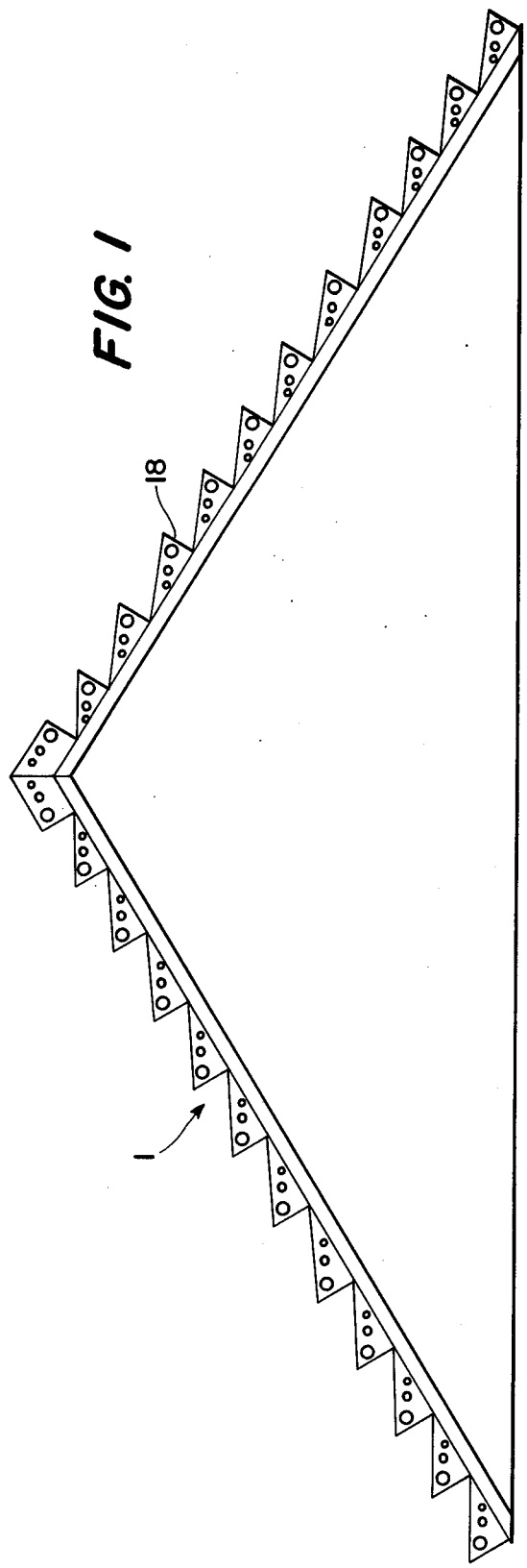
FIG. 1 is an end sectional view of the roof finished by a solar system in accordance with this invention.

In FIG. 1, the completed solar exterior is shown at 1, being made up of several sections 3, 5, and 7 (FIGS. 3 and 4).

Figure 2:
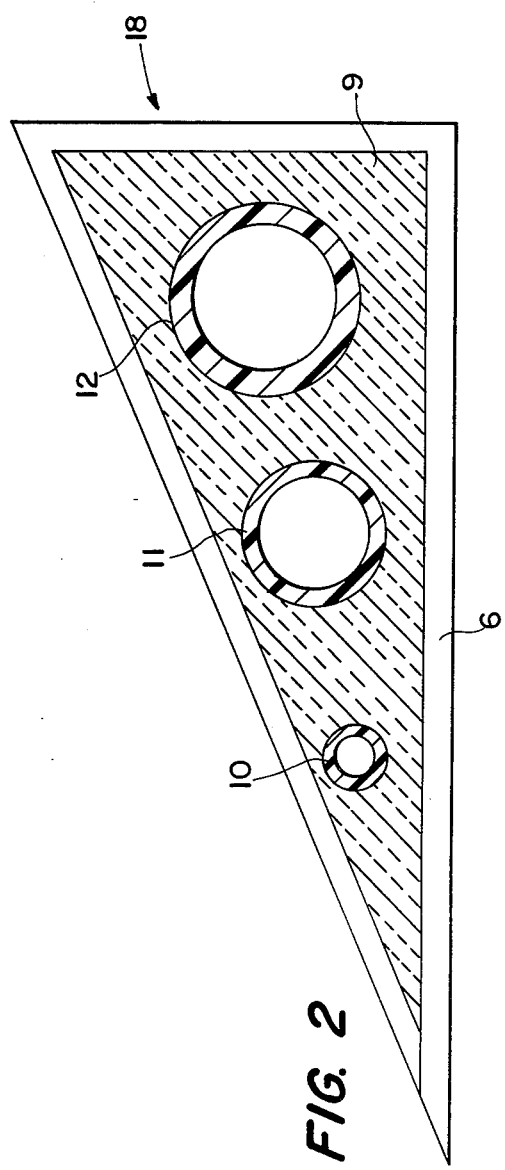
FIG. 2 is an enlarged view of one step of FIG. 1.

If FIG. 2, a single step of a section is shown enlarged to reveal the polyester resin and filler within outer surface 6— which may include the coloring and/or abrasive for tread. Black or dark-grey patterned or solid colors are preferred.

Embedded in insulation, the resin and filler 9 are three different sized pipes 10, 11, and 12. By way of example, pipe 10 may have a diameter of $\frac{3}{8}"$, pipe 11 of $\frac{1}{2}"$, and pipe 12 of $\frac{3}{4}"$. Also, I have used pipe of $\kappa"$ diameter throughout all sections without graduation. The graduated pipes simply provide a different water volume for the artistic appearance shown. Obviously, many varied structures or appearances may be To mould the sections 3, 5, and 7, I use three different moulds, all quite similar. The process is as follows:

1. Select the proper mould,
Locate the pipes in place, being held by their extending ends or extension fasteners or mounted on pins.
3. Polyester resin fluid and fillers are mixed, then the mixture is poured and allowed to set,
4. Vibration may be used to eliminate air bubbles from the mixture,
5. The mould is disassembled, and
6. The cured section is removed.

In FIG. 3, all pipes are shown of the same size. Arrow 20 indicates the flow path which follows inlet pipe 21, elbow 22, straight pipe 23 of section 5, interconnecting pipe 24 of section 3, elbow 25, straight pipe 26 and interconnecting pipe 27, etc. It is important to note that couplings 30 are sealed to the ends of the straight pipes, such as 24, of section 3 prior to moulding to receive the pipes of section 5 or intermediate section 7.

The location and pre-assembly of pipes for the various sections is obvious from the drawing. When the polyester resin and filler is poured, the ends of pipes within the moulds are covered or closed to prevent penetration. Extender pipes are usually employed to protect the ends and maintain passageways to the edge of the sections.

In FIG.4, an intermediate section 7 is shown with only pipe 40 being illustrated. Coupling 41 is located on pipe 40, so that this section may fit between outer sections 3 and 5.

The dimension of section 3, 5, and 7 are determined in accordance with roof size or standard size modules are in inventory. For example, on facet of a roof may be covered by an intermediate and two outer sections. For larger roof facets, additional sections are employed because of strength and handling Requirements, although cranes may be used for large sections, obviously. Polyester is the preferred resin.

I prefer to use panels of 300 to 500 square feet each for convenience of moulding and handling, and fitting to most medium size houses, but I have used panels of 40 to 100 square feet, subsequently.

Figure 5:
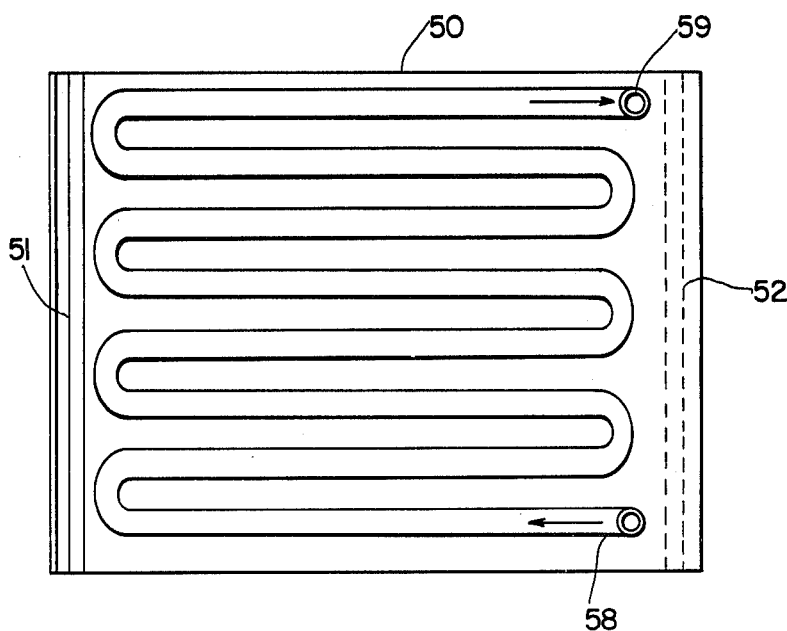
FIG. 5 is a plan view of a section with expansion accommodating edges.
Figure 6:
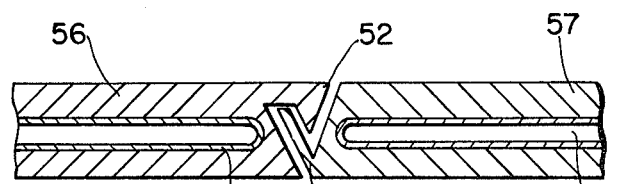
FIG. 6 is a detailed sectional view of adjacent trough and trough covering extensions.
Figure 8:
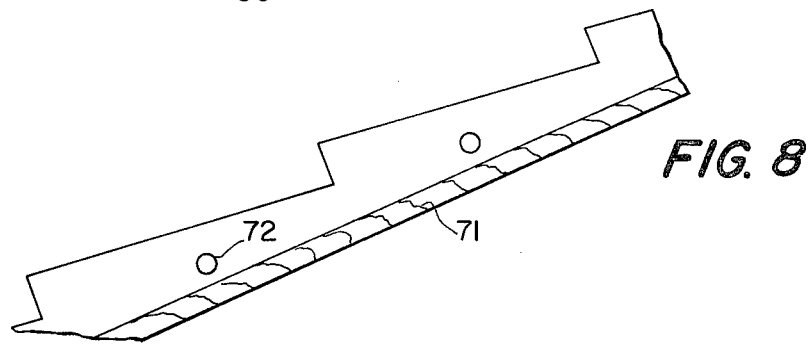
FIG. 8 is a modified type section.

FIG. 5 shows a modified section 50 with a trough 51 on one end and a trough covering edge 52 on its opposite end. FIG. 6 shows a trough 51 receiving a trough covering edge 52 in normal position to facilitate expansion while preventing water from reaching the v inch plywood roofing 71 (FIG. 8) for example.

Figure 7:
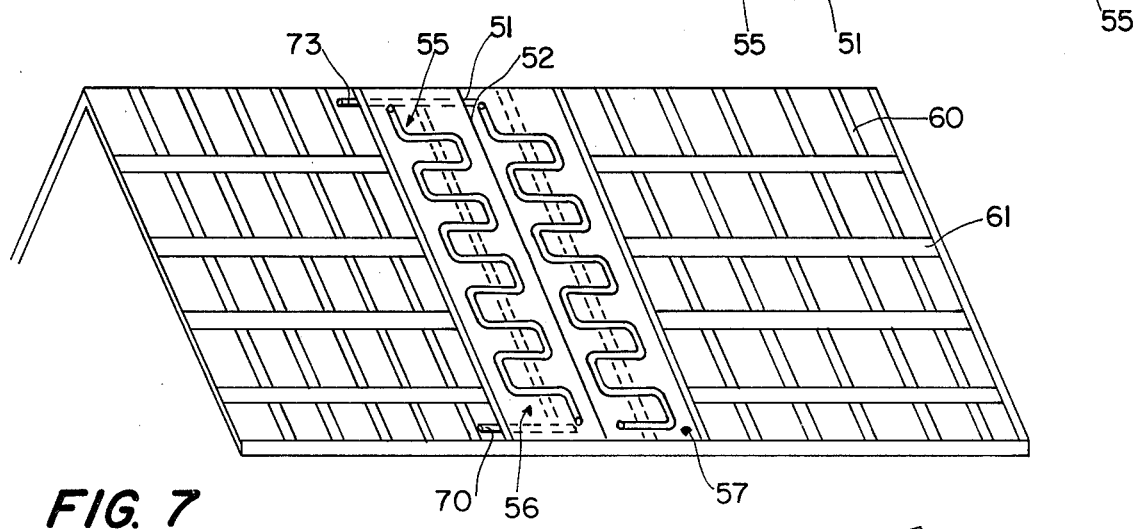
FIG. 7 shows expansion accommodating sections installed in a typical roof.

The trough 51 and trough covering 52 seams are best seen in a longitudinal engagement in FIG. 7, over framing members 60 and 61. The liquid pathway 55 in section 56 has an inlet 58 (FIG. 5) from common horizontal lower pipe 70 (FIG. 7) within the attic, and outlet 59 (FIG. 5) connecting into the common horizontal pipe 73, (FIG. 7) within the upper region of the attic. Holes may be pre-cut to connect pathway 58 and 59 in parellel with other solar sections.

Another advantage of the V-mating seam is for quick replacement.

FIG. 5 and 7 are also adaptable to the use of formed conduits in the section without the use of conduits 55 and 72. Additionally, such sections may be formed using fire retardant resins, commercially available, (TR-38179).

A suitable two-part mould may be used to form said conduits while the section is formed, as previously explained. Also, if higher cost may be tolerated, copper tubing has been found to be compatible with the present invention.

What is claimed is:

1. A solar heated liquid section unit comprising in combination,
    an insulated exterior roof facing, and
    a plurality of pipes extending throughout the interior of the facing for circulating solar heated liquid therethrough to transfer solar generated heat from said roof facing, wherein said roof facing includes a solid heat conductor body comprising silica sand filler held by a resin embodying the sand filler as a fireproofing additive and heat conductor.

2. The unit of claim 1 further comprising,
    A trough terminating edge of said section unit, and;
    a trough covering edge terminating the edge of said section unit opposite said one edge thereof.

* * * * *